(12) United States Patent
Ellis

(10) Patent No.: US 11,460,114 B2
(45) Date of Patent: Oct. 4, 2022

(54) GATE VALVE WITH IMPROVED BONNET SEAL ASSEMBLY

(71) Applicant: FMC Technologies, Inc., Houston, TX (US)

(72) Inventor: Kyle Ellis, Houston, TX (US)

(*) Notice: Subject to any disclaimer, the term of this patent is extended or adjusted under 35 U.S.C. 154(b) by 0 days.

(21) Appl. No.: 16/750,837

(22) Filed: Jan. 23, 2020

(65) Prior Publication Data

US 2021/0231222 A1 Jul. 29, 2021

(51) Int. Cl.
*F16K 3/02* (2006.01)
*F16K 17/18* (2006.01)
*F16K 3/30* (2006.01)

(52) U.S. Cl.
CPC ............ *F16K 3/0227* (2013.01); *F16K 17/18* (2013.01); *F16K 3/30* (2013.01)

(58) Field of Classification Search
CPC ...... F16K 3/0227; F16K 3/0236; F16K 3/243; F16K 3/30; F16K 27/044; F16K 27/105; F16K 41/02; F16K 41/04; F16K 41/06; F16K 41/14; F16K 41/16
See application file for complete search history.

(56) References Cited

U.S. PATENT DOCUMENTS

| | | | |
|---|---|---|---|
| 2,886,353 A * | 5/1959 | McInerney | ............ F16K 41/02 277/511 |
| 3,192,942 A | 7/1965 | Manor et al. | |
| 3,249,117 A | 5/1966 | Edwarde | |
| 3,379,405 A | 4/1968 | Natho | |
| 3,770,247 A | 11/1973 | Nelson | |
| 4,103,863 A | 8/1978 | Houlgrave et al. | |
| 6,401,747 B1 | 6/2002 | Cain et al. | |
| 9,010,725 B2 | 4/2015 | Hunter | |
| 9,347,585 B2 | 5/2016 | Helvenston et al. | |
| 2012/0085957 A1 | 4/2012 | Dhawan et al. | |
| 2014/0183396 A1* | 7/2014 | Hunter | ...................... F16K 3/30 251/328 |
| 2015/0144823 A1* | 5/2015 | Helvenston | ............ F16K 41/04 251/214 |

OTHER PUBLICATIONS

International Patent Application No. PCT/US2020/067745, International Search Report and Written Opinion of the International Searching Authority (dated Mar. 29, 2021).

* cited by examiner

*Primary Examiner* — Hailey K. Do
(74) *Attorney, Agent, or Firm* — Henry C. Query, Jr.

(57) ABSTRACT

A bonnet seal assembly for a gate valve includes a generally cylindrical packing nut positioned in the stem bore around the valve stem. The packing nut includes first and second spaced-apart annular sealing surfaces, and the bonnet seal assembly includes a third annular sealing surface connected to or formed integrally with the valve stem and a fourth annular sealing surface formed concentrically in the stem bore. In a first position of the valve stem, the first annular sealing surface sealingly engages the third annular sealing surface to thereby form a first seal between the valve stem and the packing nut, and the second annular sealing surface sealing engages the fourth annular sealing surface to thereby form a second seal between the packing nut and the stem bore. In this manner, the first and second seals together operate to seal the stem bore from fluid pressure in the gate cavity.

22 Claims, 4 Drawing Sheets

GATE VALVE WITH IMPROVED BONNET SEAL ASSEMBLY

FIELD OF THE DISCLOSURE

The present disclosure is directed to a gate valve. More particularly, the disclosure is directed to a gate valve which includes a bonnet seal assembly that in some embodiments provides two barriers to the environment in both the open and the closed position of the valve.

BACKGROUND OF THE DISCLOSURE

Prior art gate valves typically include a valve body, a flow bore which extends completely through the valve body, a gate cavity which extends partially through the valve body and intersects the flow bore, and a bonnet which is mounted to the valve body over the gate cavity. The bonnet comprises an axial stem bore within which a valve stem is movably positioned. One end of the valve stem is connected to a valve actuator and the other end is connected to a gate which is positioned in the gate cavity across the flow bore. In operation, the valve stem moves the gate between a closed position in which fluid flow through the flow bore is blocked and an open position in which fluid flow through the flow bore is permitted.

Prior art gate valves normally include a bonnet seal assembly for sealing the stem bore to thereby prevent fluid pressure in the gate cavity from escaping into the environment. Known bonnet seal assemblies typically include a thermoplastic stem packing, such as a UV stem packing, which is positioned between the valve stem and the stem bore. The stem packing provides a primary pressure containing barrier between the gate cavity and the environment.

Prior art bonnet seal assemblies usually also include a secondary sealing arrangement for isolating the stem packing from environmental fluids. Especially when the gate valve is used subsea, such as in the subsea oil and gas production industry, the secondary sealing arrangement prevents ingress of seawater and pressure into the bonnet which could cause the stem packing to fail. For example, certain prior art bonnet seal assemblies include a uni-directional seal that isolates the back of the stem packing from seawater pressure and vents leakage past the stem packing out through a relief valve in the bonnet. The secondary seal arrangement may also serve to isolate the actuator from fluid pressure in the gate cavity should the stem packing fail. For example, certain prior art bonnet seal assemblies include two bi-directional seals to isolate the valve actuator from any leakage past the stem packing.

Certain prior art gate valves are designed to include a metal "backseat" feature to supplement the sealing capability of the bonnet seal assembly. The backseat feature normally comprises a conical shoulder which is formed on the valve stem and a corresponding conical backseat surface which is formed at an end of the stem bore adjacent the gate cavity. When the valve stem is moved into its axially outer position to, e.g., close the gate valve, the shoulder will seal against the backseat surface and form a metal-to-metal barrier between the gate cavity and the stem bore. Thus, the stem packing and the backseat provide "dual barriers" between the gate cavity and the environment.

However, the backseat sealing arrangement is only engaged in one position of the valve stem, usually the closed position. The backseat is not engaged in the open position of the gate valve. In certain applications, the provision of a metal backseat sealing arrangement in both the open and closed positions of the gate valve would be desirable. Together with the stem packing, this would provide dual barriers between the gate cavity and the environment in both the open and closed positions of the gate valve, which would greatly enhance the sealing capability of the gate valve.

SUMMARY OF THE DISCLOSURE

In accordance with the present disclosure, a gate valve is provided which comprises a valve body; a flow bore which extends completely through the valve body; a gate cavity which extends partially through the valve body and intersects the flow bore; a bonnet which is mounted to the valve body over the gate cavity and comprises a stem bore which extends axially therethrough and is connected to the gate cavity; a valve stem which is movably positioned in the stem bore and comprises a first end which extends outwardly of the bonnet and a second end which extends into the gate cavity; a gate which is connected to the second end of the valve stem and is movable by the valve stem between a closed position in which fluid flow through the flow bore is blocked and an open position in which fluid flow through the flow bore is permitted; and a bonnet seal assembly for sealing the stem bore against fluid pressure in the cavity.

The bonnet seal assembly includes a generally cylindrical packing nut which is positioned in the stem bore around the valve stem and comprises first and second spaced-apart annular sealing surfaces which are formed concentrically with the stem bore; a third annular sealing surface which is connected to or formed integrally with the valve stem; and a fourth annular sealing surface which is formed concentrically in the stem bore. In in a first position of the valve stem, the first annular sealing surface sealingly engages the third annular sealing surface to thereby form a first seal to seal the annulus between the valve stem and the packing nut, and the second annular sealing surface sealing engages the fourth annular sealing surface to thereby form a second seal to seal the annulus between the packing nut and the stem bore. In this manner, the first and second seals together operate to seal the stem bore from fluid pressure in the gate cavity. Moreover, the first position of the valve stem corresponds to one of the open position or the closed position of the gate.

In accordance with one aspect of the disclosure, the third annular sealing surface may be formed on an actuator drive stem which is connected to the first end of the valve stem or on an adapter coupling which connects the actuator drive stem to the first end of the valve stem.

In accordance with another aspect of the disclosure, the stem bore may have an enlarged diameter bore portion within which the packing nut is positioned, and the fourth annular sealing surface may be located at an axially inner end of the enlarged diameter bore portion.

In accordance with yet another aspect of the disclosure, the first annular sealing surface may be formed proximate an axially outer end of the packing nut and the second annular sealing surface may be formed proximate an axially inner end of the packing nut.

In accordance with a further aspect of the disclosure, the bonnet seal assembly may further comprise a fifth annular sealing surface which is connected to or formed integrally with the valve stem axially inwardly of the third annular sealing surface, and a sixth annular sealing surface which is formed concentrically in the stem bore axially inwardly of the fourth annular sealing surface. In this embodiment, in a second position of the valve stem, the fifth annular sealing surface sealingly engages the sixth annular sealing surface to thereby form a third seal which operates to seal the stem bore against the fluid pressure in the gate cavity. Also, the second position of the valve stem corresponds to the other of the open position or the closed position of the gate.

In accordance with another aspect of the disclosure, the bonnet seal assembly may further comprise a stem packing which is positioned between the valve stem and the stem bore axially inwardly of the fourth annular sealing surface. In this embodiment, the stem packing provides a pressure containing barrier between the gate cavity and the environment. Thus, in the first position of the valve stem, the stem packing and the first and second seals provide two pressure containing barriers between the gate cavity and the environment, and in the second position of the valve stem, the stem packing and the third seal provide two pressure containing barriers between the gate cavity and the environment.

In accordance with yet another aspect of the disclosure, the bonnet seal assembly may further comprise first and second bi-directional seals which are mounted on the packing nut. In this embodiment, the first bi-directional seal is sealingly engaged between the valve stem and the packing nut and the second bi-directional seal is sealingly engaged between the packing nut and the stem bore.

In accordance with a further aspect of the disclosure, the gate valve may also comprise a pressure bleed port which extends laterally through the bonnet to a portion of the stem bore located between the first and second annular sealing surfaces, and a pressure relief valve which is mounted in the pressure bleed port.

In accordance with still another aspect of the disclosure, the bonnet seal assembly may further comprise a unidirectional seal which is positioned between the stem bore and a portion of the packing nut located between the first and second annular sealing surfaces. In this embodiment, the unidirectional seal is configured to seal against pressure in a portion of the stem bore located axially outwardly of the unidirectional seal.

In accordance with yet another aspect of the disclosure, the packing nut may be axially movably retained in the stem bore. The packing nut may be retained in the stem bore by a retainer nut which is secured to the bonnet axially outwardly of the packing nut. Also, the gate valve may comprise a spring member which is positioned between the retainer nut and the packing nut and is configured to bias the packing nut axially inwardly.

Thus, it may be seen that the bonnet seal assembly of the present disclosure provides backseat seals in both the open and closed positions of the gate valve. In some embodiments, the backseat seals are provided as metal backseat seals. In embodiments in which the bonnet seal assembly also includes a stem packing, the backseat seals, together with the stem packing, provide two pressure containing barriers between the gate cavity and the environment in both the open and closed positions of the gate valve. This greatly enhances the sealing capability of the gate valve.

The gate valve may be configured such that, when the valve is in the open position, the valve actuator imparts a continuous inwardly directed load on the packing nut, thus energizing the first and second backseat seals. In this position, the stem packing provides the primary barrier between the gate cavity and the environment and the first and second backseat seals provide the second barrier between the gate cavity and the environment.

The gate valve may also be configured such that, when the valve is in the closed position, the valve actuator imparts a continuous outwardly directed load on the valve stem, thus energizing the third backseat seal. Fluid pressure in the gate cavity may also contribute to the outwardly directed force on the valve stem. In this position, the third backseat seal provides the primary barrier between the gate cavity and the environment and the stem packing provides the second barrier between the gate cavity and the environment.

When the gate valve is in an intermediate position or the closed position, the volume behind (i.e., outwardly of) the stem packing is in communication, via the uni-directional seal, with the pressure relief valve and can therefore self-vent any pressure build-up behind the stem packing. This feature will prevent trapped pressure from degrading the wear life of the individual seals (which could result in migration of fluid pressure, e.g., from the gate cavity into the actuator), or otherwise impairing the performance of the bonnet seal assembly.

These and other objects and advantages of the present disclosure will be made apparent from the following detailed description, with reference to the accompanying drawings.

DETAILED DESCRIPTION OF THE DISCLOSURE

Figure 1:
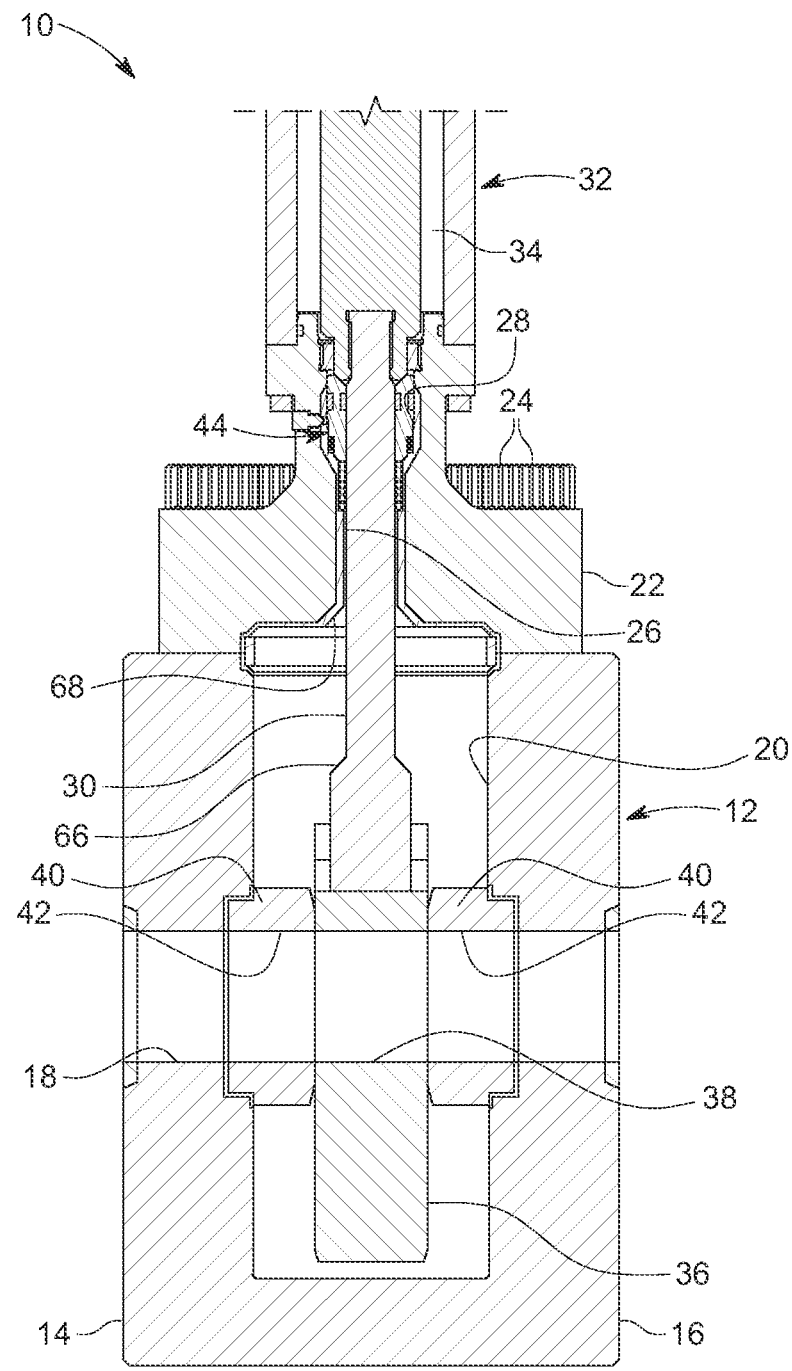
FIG. 1 is a cross sectional view of one embodiment of the gate valve of the present disclosure shown in the open position.
Figure 2:
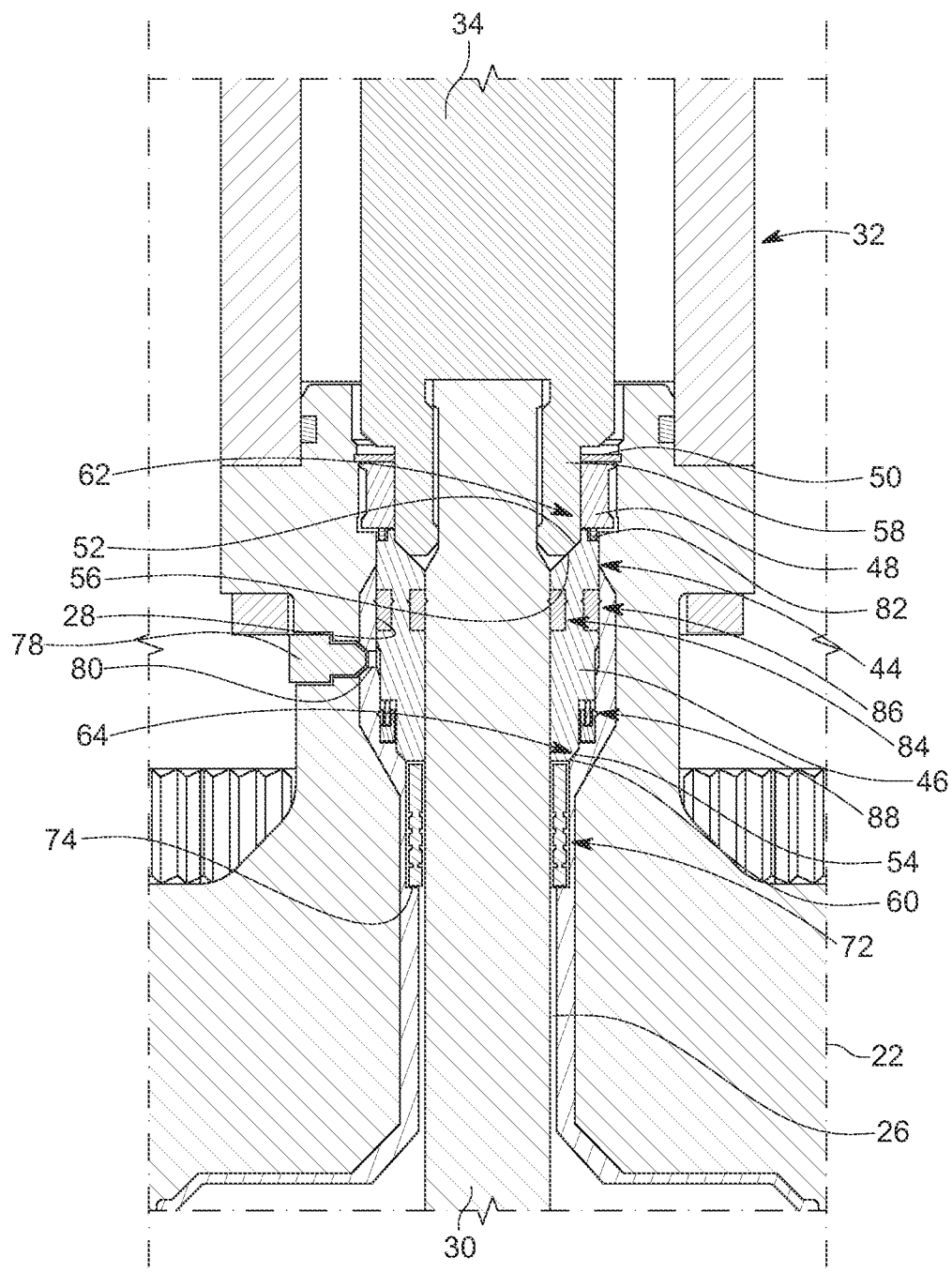
FIG. 2 is an enlarged cross sectional view of the bonnet seal assembly shown in FIG. 1.

Referring to FIG. 1, the gate valve in accordance with an exemplary embodiment of the present invention, generally 10, includes a valve body 12 having opposite first and second ends or sides 14, 16, a flow bore 18 which extends completely through the valve body between the first and second sides 14, 16, and a gate cavity 20 which extends partially through the valve body and intersects the flow bore. A valve bonnet 22 is mounted to the valve body 12 over the gate cavity 20. The bonnet 22 may be removably secured to the valve body 12 by suitable means, such as a plurality of bolts 24. Referring also to FIG. 2, the bonnet 22 includes a stem bore 26 which extends axially therethrough to the gate cavity 20. In some embodiments, the stem bore 26 may comprise an enlarged diameter bore portion 28 which is formed in an end of the stem bore opposite the gate cavity 20.

A valve stem 30 is movably positioned in the stem bore 26. The valve stem 30 has a first end which extends outwardly of the bonnet 22 and a second end which extends into the gate cavity 20. The valve stem 30 is movable between first and second positions to either open or close the gate valve 10. In some embodiments, movement of the valve stem 30 is effected by a valve actuator 32 (only a portion of which is shown) which is connected to the first end of the valve stem. The actuator 32 may comprise any conventional manual or powered (e.g., hydraulic, electric or pneumatic) valve actuator. In addition, the actuator 32 may include a spring or other suitable biasing means (not shown) for biasing the valve stem 30 into a desired position, such as a failsafe closed position.

In one embodiment of the disclosure, the gate valve 10 may be a rising stem gate valve and the valve actuator 32 may be a powered actuator which moves the valve stem 30 linearly through the stem bore 26. In this example, the actuator 32 includes a drive stem 34 to which the valve stem 30 is connected, and the actuator operates to shift the drive stem between an extended position (shown in FIG. 1) and a retracted position (shown in FIG. 3) to thereby move the valve stem 30 between its first and second positions.

Figure 3:
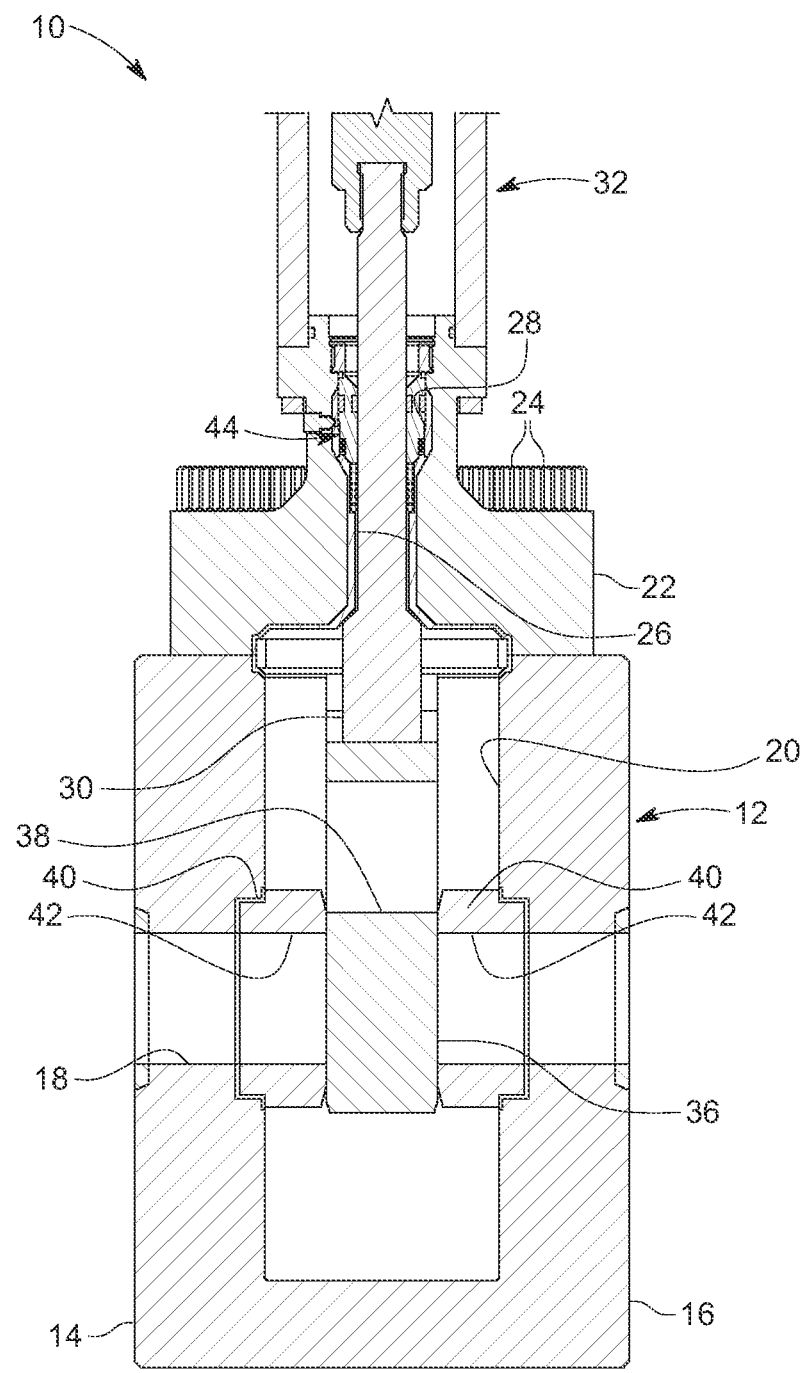
FIG. 3 is a cross sectional view of the gate valve of FIG. 1 shown in the closed position.

The second end of the valve stem 30 is connected to a gate 36. The gate 36 includes a transverse through hole 38 which, when the gate valve 10 is in the open position, is aligned with the flow bore 18. The gate 36 may be slidably disposed between a pair of seats 40, each of which comprises an axial through bore 42 which is concentric with the flow bore 18. In the open position of the gate valve 10, which is shown in FIG. 1, the through hole 38 is aligned with the through bores 42 and fluid is therefore permitted to flow through the flow bore 18. In the closed position of the gate valve 10, which is shown in FIG. 3, the through hole 38 is offset from the through bores 42 and fluid is therefore prevented from flowing through the flow bore 18.

In use of the gate valve 10, fluid pressure in the cavity 20 is prevented from escaping through the stem bore 26 into the external environment by the bonnet seal assembly of the present disclosure. Referring to FIG. 2, the bonnet seal assembly, generally 44, includes a generally cylindrical packing nut 46 which is positioned in the stem bore 26 around the valve stem 30. In one embodiment of the disclosure, the packing nut 46 may be positioned in the enlarged diameter bore portion 28 of the stem bore 26. The packing nut 46 may be secured in the stem bore 26 with any suitable means, such as a retainer nut 48. The retainer nut 48 may be threaded into the stem bore 26 or secured therein using any appropriate means, such as an anti-rotation retainer clip 50.

In accordance with one embodiment of the disclosure, the packing nut 46 comprises first and second spaced-apart annular sealing surfaces 52, 54 which are formed concentrically with the stem bore 26. The first annular sealing surface 52 is configured to sealingly engage a third annular sealing surface 56 which is connected to or formed integrally with the valve stem 30. For example, the third annular sealing surface 56 may be formed on a lower neck portion 58 of the drive stem 34 of the valve actuator 32. Alternatively, the third annular sealing surface 56 may be formed on an adapter which is used to connect the drive stem 34 to the valve stem 30. In other embodiments, the third annular sealing surface 56 may be formed on a radial flange which is connected to or formed integrally with the valve stem 30. In these embodiments, the first annular sealing surface 52 may be formed on or adjacent the axially outer end of the packing nut 46. Furthermore, the first and third annular sealing surfaces 52, 56 may comprise different angles relative to the centerline of the valve stem 30 in order to achieve an essentially circumferential line contact, or they may comprise substantially the same angle to achieve a distributed contact over an annular area.

The second annular sealing surface 54 is configured to engage a fourth annular sealing surface 60 which is formed concentrically in the stem bore 26. In one embodiment, the fourth annular sealing surface 60 is formed at the axially inner end of the enlarged diameter bore portion 28 of the stem bore 26. In this embodiment, the second annular sealing surface 54 may be formed on an axially inner end of the packing nut 46. As with the first and third annular sealing surfaces 52, 56, the second and fourth annular sealing surfaces 54, 60 may comprise different angles relative to the centerline of the valve stem 30 in order to achieve an essentially circumferential line contact, or they may comprise substantially the same angle to achieve a distributed contact over an annular area.

In the first position of the valve stem 30, the first annular sealing surface 52 sealingly engages the third annular sealing surface 56 to thereby form a first backseat seal 62 which functions to seal the annulus between the valve stem and the packing nut 46. At the same time, the second annular sealing surface 54 sealing engages the fourth annular sealing surface 60 to thereby form a second backseat seal 64 which functions to seal the annulus between the packing nut and the stem bore 26. Thus, in the first position of the valve stem 30, the first and second seals 62, 64 together operate to seal the stem bore 26 from fluid pressure in the gate cavity 20 and thereby provide a pressure containing barrier between the gate cavity and the environment. In this regard, the first seal 62 provides a pressure containing barrier between fluid pressure in the gate cavity 20 and the valve actuator 32 (specifically, the bore of the valve actuator), thus providing an effective backup to any bi-directional seal which may be positioned between the valve stem 30 and the packing nut 46. Additionally, if the fluid pressure in the gate cavity 20 is lower than the environment (e.g., sea water) pressure, the first and second seals 62, 64 will provide an effective backup to any conventional seals contained in the bonnet seal assembly to prevent ingress of actuator fluid (by the first seal 62) or sea water fluid (by the second seal 64) into the gate valve cavity.

The gate valve 10 may be configured such that the first position of the valve stem 30 corresponds to either the open or closed position of the gate 36 and either the extended or retracted position of the drive stem 34. In the embodiment of the disclosure shown in the drawings, for example, the gate valve 10 is configured such that the first position of the valve stem 30 corresponds to the open position of the gate 36, which also corresponds to the extended position of the drive stem 34. This position is shown in FIGS. 1 and 2. Accordingly, in this embodiment of the gate valve 10, the second position of the valve stem 30 corresponds to the closed position of the gate 36, which also corresponds to the retracted position of the drive stem 34. This position is shown in FIGS. 3 and 4.

Figure 4:
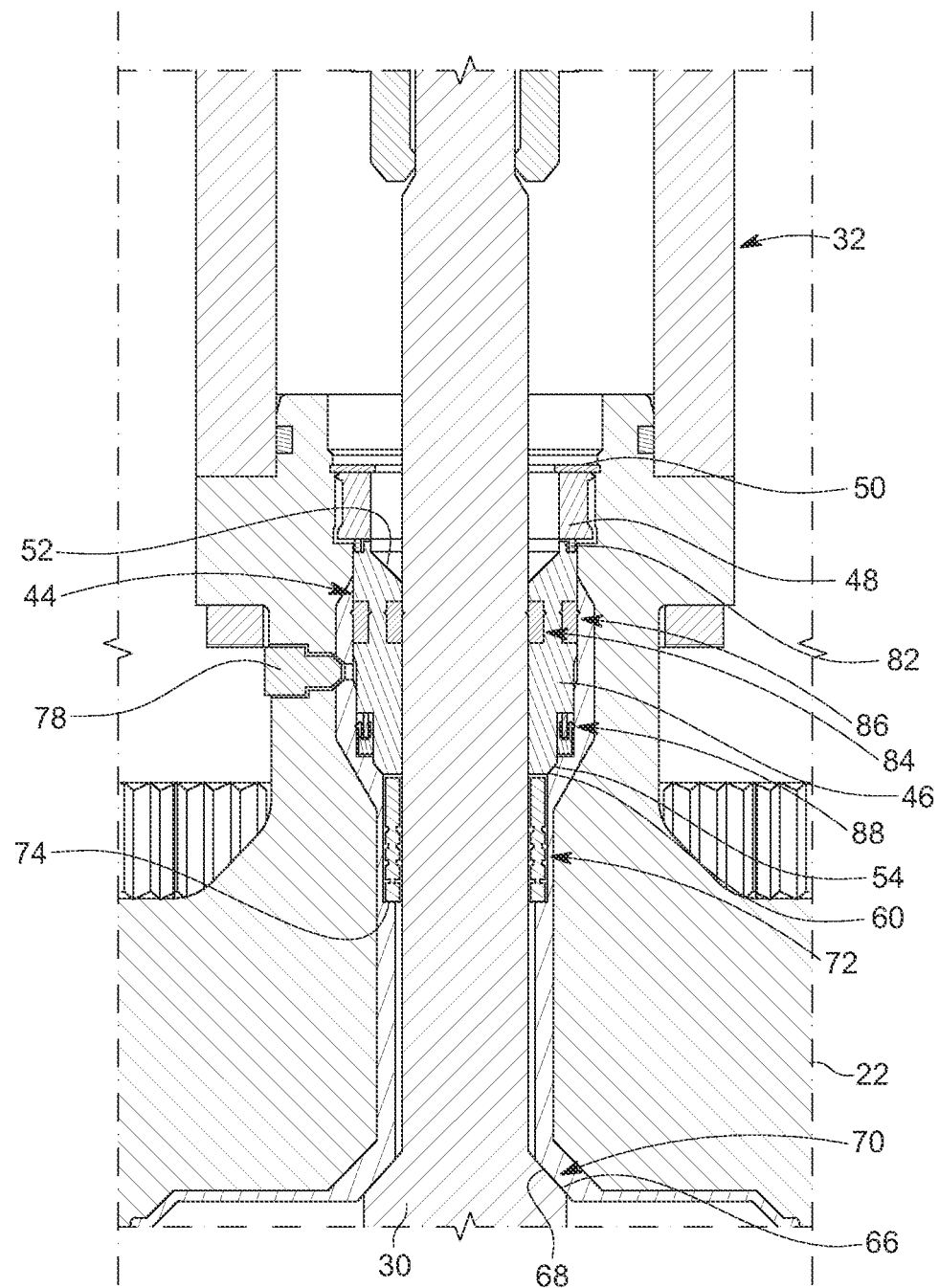
FIG. 4 is an enlarged cross sectional view of the bonnet seal assembly shown in FIG. 3.

Referring also to FIGS. 3 and 4, in certain embodiments of the present disclosure, the bonnet seal assembly 44 may comprise a fifth annular sealing surface 66 which is connected to or formed integrally with the valve stem 30 axially inwardly of the third annular sealing surface 56, and a sixth annular sealing surface 68 which is formed concentrically in the stem bore 26 axially inwardly of the fourth annular sealing surface 60. For example, the fifth annular sealing surface 66 may comprise a conical sealing shoulder which is connected to or formed integrally on the valve stem 30, and the sixth annular sealing surface 68 may comprise a conical backseat which is formed at an axially inner end of the stem bore 26.

In the second position of the valve stem 30, the fifth annular sealing surface 66 sealingly engages the sixth annular sealing surface 68 to thereby form a third backseat seal 70 between the valve stem and the stem bore 26. Thus, in the second position of the valve stem 30, the third seal 70 operates to seal the stem bore 26 from fluid pressure in the gate cavity 20 and thereby provide a pressure containing barrier between the gate cavity and the environment.

In embodiments of the disclosure in which the first position of the valve stem 30 corresponds to the extended position of the drive stem 34 and the second position of the valve stem corresponds to the retracted position of the drive stem, the gate valve 10 may be configured such that, in the extended position of the drive stem, the valve actuator 32 exerts an axially inwardly directed force on the packing nut 46 to thereby energize the first and second seals 62, 64. Similarly, the gate valve 10 may be configured such that, in the retracted position of the drive stem 34, the valve actuator 32 exerts an axially outwardly directed force on the valve stem 30 to thereby energize the third seal 70. Alternatively, in the retracted position of the drive stem 34, fluid pressure in the gate cavity 20 may be sufficiently high to exert an outwardly directed force on the valve stem 30 which will adequately energize the third seal 70.

In certain embodiments of the gate valve 10, the bonnet seal assembly 44 may also comprise a stem packing 72 which is positioned between the valve stem 30 and the stem bore 26 axially inwardly of the fourth annular sealing surface 60. In some embodiments, the stem packing 72 may be supported on an annular step 74 which is formed in the stem bore 26 between the fourth annular sealing surface 60 and the sixth annular sealing surface 68. The stem packing 72 may comprise any suitable dynamic sealing arrangement, such as the UV stem packing sold by TechnipFMC PLC of Houston, Tex.

In normal operation of the gate valve 10, the stem packing 72 provides a pressure containing barrier between the gate cavity 20 and the environment. Accordingly, in the first position of the valve stem 30 (which in the embodiment of the disclosure shown in drawings corresponds to the open position of the gate 36), the stem packing 72 and the first and second seals 62, 64 provide two pressure containing barriers between the gate cavity 20 and the environment. Similarly, in the second position of the valve stem 30 (which in the embodiment of the disclosure shown in the drawings corresponds to the closed position of the gate 36), the stem packing 72 and the third seal 70 provide two pressure containing barriers between the gate cavity 20 and the environment. In this manner, in certain embodiments of the disclosure, the bonnet seal assembly 44 provides dual pressure containing barriers between the gate cavity 20 and the environment in both the open and closed position of the gate valve 10.

In some embodiments, the components of the gate valve 10 on which the first through six annular sealing surfaces are formed may be wholly or partially made of suitable metal materials. For example, the bonnet 22, the valve stem 30, the drive stem 34 and the packing nut 46 may all be made of suitable metal materials. Alternatively, only the annular sealing surfaces themselves may be made of suitable metallic materials. In this manner, the first, second and third backseat seals 62, 64, 70 will comprise metal-to-metal seals. If desired or required for a particular application, the first through sixth annular sealing surface may also be hardfaced.

Referring again to FIG. 2, in certain embodiments of the gate valve 10 the bonnet 22 may include a pressure relief valve 78 which is mounted in a pressure bleed port 80 that extends to a portion of the stem bore 26 located between the first and second annular sealing surfaces 52, 54. In the event the stem packing 72 develops a leak, any fluid pressure which becomes trapped between the first and second seals 62, 64, for example during movement of the valve stem 30 between the first and second positions, will be vented through the pressure relief valve 78 into the environment. This feature will prevent trapped pressure from degrading the wear life of the individual seals (which could result in migration of fluid pressure, e.g., from the gate cavity into the actuator), or otherwise impairing the performance of the bonnet seal assembly 44. The pressure relief valve 78 may be bi-directional as well; that is, it may be designed to check at a specified internal pressure and be fully rated for external pressure.

In some embodiments of the gate valve 10, the packing nut 46 may be axially movably positioned in the stem bore 26. This will ensure that any fluid pressure which leaks past the stem packing 72 will be able to pass between the second and fourth annular sealing surfaces 54, 60 and be vented through the pressure relief valve 78.

Additionally, the bonnet seal assembly 44 may comprise means for biasing the packing nut 46 axially inwardly against the fourth annular sealing surface 60. As shown in FIG. 2, such means may comprise, for example, a spring member 82 which is positioned between the retainer nut 48 and the axially outer end of the packing nut 46. In this embodiment, the spring member 82 may be configured to exert a biasing force on the packing nut 46 which is less than the fluid pressure in the gate cavity 20 so as not to inhibit fluid pressure which leaks past the stem packing 72 from passing between the second and fourth annular sealing surfaces 54, 60 and being vented through the pressure relief valve 78.

In accordance with some embodiments of the present disclosure, the bonnet seal assembly 44 may further include a first bi-directional seal 84 which is positioned between the packing nut 46 and the valve stem 30 and a second bi-directional seal 86 which is positioned between the packing nut and the stem bore 26. The first and second bi-directional seals 84, 86 may be mounted, e.g., in corresponding annular grooves which are formed on the inner and outer diameter surfaces of the packing nut 46, respectively. In this embodiment, the bi-directional seals 84, 86 may serve as the primary barrier seals for the hydraulic fluid in the actuator 32. Also, when the valve stem 30 is in a position in which the third seal 70 is not engaged, the bi-directional seals 84, 86 function to direct fluid pressure in the gate cavity to the pressure relief valve 78 in the event the stem packing 72 fails.

The bonnet seal assembly 44 may also comprise a uni-directional seal 88 which is positioned between the packing nut 46 and the stem bore 26 axially inwardly of the pressure bleed port 80. In this embodiment, the uni-directional seal 88 is configured to seal against pressure in a portion of the stem bore 26 located axially outwardly of the uni-directional seal to thereby prevent seawater or other environmental fluids from affecting the stem packing 72 should the second bi-directional seal 86 or the pressure relief valve fail. Due to its uni-directional nature, however, the uni-directional seal 88 will not inhibit fluid pressure which leaks past the stem packing 72 from being vented through the pressure relief valve 78.

In embodiments of the disclosure in which the bonnet seal assembly 44 includes the bi-directional seals 84, 86 and the uni-directional seal 88, the first seal 62 provides a pressure containing barrier between fluid pressure in the gate cavity 20 and the valve actuator 32, thus providing an effective backup to the first bi-directional seal. Additionally, if the fluid pressure in the gate cavity 20 is lower than the environment (e.g., sea water) pressure, the second seal 64 will provide an effective backup to the unidirectional seal 88.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A gate valve comprising:
   a valve body;
   a flow bore which extends completely through the valve body;
   a gate cavity which extends partially through the valve body and intersects the flow bore;
   a bonnet which is mounted to the valve body over the gate cavity, the bonnet comprising a stem bore which extends axially therethrough and is connected to the gate cavity;
   a valve stem which is movably positioned in the stem bore, the valve stem comprising a first end and an opposite second end which extends into the gate cavity;
   a gate which is connected to the second end of the valve stem, the gate being movable by the valve stem between a closed position in which fluid flow through the flow bore is blocked and an open position in which fluid flow through the flow bore is permitted; and
   a bonnet seal assembly for sealing the stem bore against fluid pressure in the cavity, the bonnet seal assembly comprising:
      a generally cylindrical packing nut which is positioned in the stem bore around the valve stem, the packing nut comprising first and second spaced-apart annular sealing surfaces which are formed concentrically with the stem bore;
      a third annular sealing surface which is connected to or formed integrally with the valve stem and is configured to sealingly engage the first annular sealing surface; and
      a fourth annular sealing surface which is formed concentrically in the stem bore and is configured to sealingly engage the second annular sealing surface;
   wherein in a first position of the valve stem, the first annular sealing surface sealingly engages the third annular sealing surface to thereby form a first seal to seal the annulus between the valve stem and the packing nut, and the second annular sealing surface sealing engages the fourth annular sealing surface to thereby form a second seal to seal the annulus between the packing nut and the stem bore;
   wherein in a second position of the valve stem, at least one of the first and second annular sealing surfaces does not sealingly engage its respective third or fourth annular sealing surface;
   wherein the first and second seals together operate to seal the stem bore from fluid pressure in the gate cavity;
   wherein the first position of the valve stem corresponds to one of the open position or the closed position of the gate; and
   wherein the bonnet seal assembly further comprises first and second bi-directional seals which are mounted on the packing nut, the first bi-directional seal being sealingly engaged between the valve stem and the packing nut and the second bi-directional seal being sealingly engaged between the packing nut and the stem bore.

2. A gate valve comprising:
   a valve body;
   a flow bore which extends completely through the valve body; a gate cavity which extends partially through the valve body and intersects the flow bore;
   a bonnet which is mounted to the valve body over the gate cavity, the bonnet comprising a stem bore which extends axially therethrough and is connected to the gate cavity;
   a valve stem which is movably positioned in the stem bore, the valve stem comprising a first end and an opposite second end which extends into the gate cavity;
   a gate which is connected to the second end of the valve stem, the gate being movable by the valve stem between a closed position in which fluid flow through the flow bore is blocked and an open position in which fluid flow through the flow bore is permitted; and
   a bonnet seal assembly for sealing the stem bore against fluid pressure in the cavity, the bonnet seal assembly comprising:
      a generally cylindrical packing nut which is positioned in the stem bore around the valve stem, the packing nut comprising first and second spaced-apart annular sealing surfaces which are formed concentrically with the stem bore;
      a third annular sealing surface which is connected to or formed integrally with the valve stem and is configured to sealingly engage the first annular sealing surface; and
      a fourth annular sealing surface which is formed concentrically in the stem bore and is configured to sealingly engage the second annular sealing surface;
   wherein in a first position of the valve stem, the first annular sealing surface sealingly engages the third annular sealing surface to thereby form a first seal to seal the annulus between the valve stem and the packing nut, and the second annular sealing surface sealing engages the fourth annular sealing surface to thereby form a second seal to seal the annulus between the packing nut and the stem bore;
   wherein in a second position of the valve stem, at least one of the first and second annular sealing surfaces does not sealingly engage its respective third or fourth annular sealing surface;
   wherein the first and second seals together operate to seal the stem bore from fluid pressure in the gate cavity;
   wherein the first position of the valve stem corresponds to one of the open position or the closed position of the gate; and
   wherein the gate valve further comprises:
   a pressure bleed port which extends laterally through the bonnet to a portion of the stem bore located between the first and second annular sealing surfaces; and
   a pressure relief valve which is mounted in the pressure bleed port.

3. A gate valve comprising:
   a valve body;
   a flow bore which extends completely through the valve body;
   a gate cavity which extends partially through the valve body and intersects the flow bore;
   a bonnet which is mounted to the valve body over the gate cavity, the bonnet comprising a stem bore which extends axially therethrough and is connected to the gate cavity;
   a valve stem which is movably positioned in the stem bore, the valve stem comprising a first end and an opposite second end which extends into the gate cavity;
   a gate which is connected to the second end of the valve stem, the gate being movable by the valve stem between a closed position in which fluid flow through the flow bore is blocked and an open position in which fluid flow through the flow bore is permitted; and a bonnet seal assembly for sealing the stem bore against fluid pressure in the cavity, the bonnet seal assembly comprising:
- a generally cylindrical packing nut which is positioned in the stem bore around the valve stem, the packing nut comprising first and second spaced-apart annular sealing surfaces which are formed concentrically with the stem bore;
- a third annular sealing surface which is connected to or formed integrally with the valve stem and is configured to sealingly engage the first annular sealing surface; and
- a fourth annular sealing surface which is formed concentrically in the stem bore and is configured to sealingly engage the second annular sealing surface;

wherein in a first position of the valve stem, the first annular sealing surface sealingly engages the third annular sealing surface to thereby form a first seal to seal the annulus between the valve stem and the packing nut, and the second annular sealing surface sealingly engages the fourth annular sealing surface to thereby form a second seal to seal the annulus between the packing nut and the stem bore;

wherein in a second position of the valve stem, at least one of the first and second annular sealing surfaces does not sealingly engage its respective third or fourth annular sealing surface;

wherein the first and second seals together operate to seal the stem bore from fluid pressure in the gate cavity;

wherein the first position of the valve stem corresponds to one of the open position or the closed position of the gate; and wherein the bonnet seal assembly further comprises a unidirectional seal which is positioned between the stem bore and a portion of the packing nut located between the first and second annular sealing surfaces, the unidirectional seal being configured to seal against pressure in a portion of the stem bore located axially outwardly of the unidirectional seal.

4. A gate valve comprising:

a valve body;

a flow bore which extends completely through the valve body;

a gate cavity which extends partially through the valve body and intersects the flow bore;

a bonnet which is mounted to the valve body over the gate cavity, the bonnet comprising a stem bore which extends axially therethrough and is connected to the gate cavity;

a valve stem which is movably positioned in the stem bore, the valve stem comprising a first end and an opposite second end which extends into the gate cavity;

a gate which is connected to the second end of the valve stem, the gate being movable by the valve stem between a closed position in which fluid flow through the flow bore is blocked and an open position in which fluid flow through the flow bore is permitted; and a bonnet seal assembly for sealing the stem bore against fluid pressure in the cavity, the bonnet seal assembly comprising:
- a generally cylindrical packing nut which is positioned in the stem bore around the valve stem, the packing nut comprising first and second spaced-apart annular sealing surfaces which are formed concentrically with the stem bore;
- a third annular sealing surface which is connected to or formed integrally with the valve stem and is configured to sealingly engage the first annular sealing surface; and
- a fourth annular sealing surface which is formed concentrically in the stem bore and is configured to sealingly engage the second annular sealing surface;

wherein in a first position of the valve stem, the first annular sealing surface sealingly engages the third annular sealing surface to thereby form a first seal to seal the annulus between the valve stem and the packing nut, and the second annular sealing surface sealing engages the fourth annular sealing surface to thereby form a second seal to seal the annulus between the packing nut and the stem bore;

wherein in a second position of the valve stem, at least one of the first and second annular sealing surfaces does not sealingly engage its respective third or fourth annular sealing surface;

wherein the first and second seals together operate to seal the stem bore from fluid pressure in the gate cavity;

wherein the first position of the valve stem corresponds to one of the open position or the closed position of the gate; and wherein the packing nut is axially movably retained in the stem bore.

5. The gate valve of claim 4, wherein the third annular sealing surface is formed on an actuator drive stem which is connected to the first end of the valve stem or on an adapter coupling which connects the actuator drive stem to the first end of the valve stem.

6. The gate valve of claim 4, wherein the bonnet seal assembly further comprises:
- a fifth annular sealing surface which is connected to or formed integrally with the valve stem axially inwardly of the third annular sealing surface; and
- a sixth annular sealing surface which is formed concentrically in the stem bore axially inwardly of the fourth annular sealing surface;

wherein in a second position of the valve stem, the fifth annular sealing surface sealingly engages the sixth annular sealing surface to thereby form a third seal which operates to seal the stem bore against the fluid pressure in the gate cavity; and wherein the second position of the valve stem corresponds to the other of the open position or the closed position of the gate.

7. The gate valve of any of claims 4-6, wherein the bonnet seal assembly further comprises:
- a stem packing which is positioned between the valve stem and the stem bore axially inwardly of the fourth annular sealing surface, the stem packing providing a pressure containing barrier between the gate cavity and the environment;

wherein in the first position of the valve stem, the stem packing and the first and second seals provide two pressure containing barriers between the gate cavity and the environment; and wherein in the second position of the valve stem, the stem packing and the third seal provide two pressure containing barriers between the gate cavity and the environment.

8. The gate valve of claim 4, wherein the stem bore comprises an enlarged diameter bore portion within which the packing nut is positioned, and wherein the fourth annular sealing surface is located at an axially inner end of the enlarged diameter bore portion.

9. The gate valve of claim 8, wherein the first annular sealing surface is formed proximate an axially outer end of the packing nut and the second annular sealing surface is formed proximate an axially inner end of the packing nut.

10. The gate valve of claim 4, wherein the packing nut is retained in the stem bore by a retainer nut which is secured to the bonnet axially outwardly of the packing nut.

11. The gate valve of claim 10, further comprising a spring member which is positioned between the retainer nut and the packing nut and is configured to bias the packing nut axially inwardly.

12. A gate valve comprising:
  a valve body;
  a flow bore which extends completely through the valve body;
  a gate cavity which extends partially through the valve body and intersects the flow bore;
  a bonnet which is mounted to the valve body over the gate cavity, the bonnet comprising a stem bore which extends axially therethrough and is connected to the gate cavity;
  a valve stem which is movably positioned in the stem bore, the valve stem comprising a first end and an opposite second end which extends into the gate cavity;
  a gate which is connected to the second end of the valve stem, the gate being movable by the valve stem between a closed position in which fluid flow through the flow bore is blocked and an open position in which fluid flow through the flow bore is permitted; and
  a bonnet seal assembly for sealing the stem bore against fluid pressure in the cavity, the bonnet seal assembly comprising:
    a generally cylindrical packing nut which is positioned in the stem bore around the valve stem, the packing nut comprising first and second spaced-apart annular sealing surfaces which are formed concentrically with the stem bore;
    a third annular sealing surface which is connected to or formed integrally with the valve stem; and
    a fourth annular sealing surface which is formed concentrically in the stem bore;
  wherein in a first position of the valve stem, the first annular sealing surface sealingly engages the third annular sealing surface to thereby form a first seal to seal the annulus between the valve stem and the packing nut, and the second annular sealing surface sealing engages the fourth annular sealing surface to thereby form a second seal to seal the annulus between the packing nut and the stem bore;
  wherein the first and second seals together operate to seal the stem bore from fluid pressure in the gate cavity;
  wherein the first position of the valve stem corresponds to one of the open position or the closed position of the gate; and
  wherein the third annular sealing surface is formed on an actuator drive stem which is connected to the first end of the valve stem or on an adapter coupling which connects the actuator drive stem to the first end of the valve stem.

13. The gate valve of claim 12, wherein the bonnet seal assembly further comprises:
  a fifth annular sealing surface which is connected to or formed integrally with the valve stem axially inwardly of the third annular sealing surface; and
  a sixth annular sealing surface which is formed concentrically in the stem bore axially inwardly of the fourth annular sealing surface;
  wherein in a second position of the valve stem, the fifth annular sealing surface sealingly engages the sixth annular sealing surface to thereby form a third seal which operates to seal the stem bore against the fluid pressure in the gate cavity; and
  wherein the second position of the valve stem corresponds to the other of the open position or the closed position of the gate.

14. The gate valve of any of claims 12, wherein the bonnet seal assembly further comprises:
  a stem packing which is positioned between the valve stem and the stem bore axially inwardly of the fourth annular sealing surface, the stem packing providing a pressure containing barrier between the gate cavity and the environment;
  wherein in the first position of the valve stem, the stem packing and the first and second seals provide two pressure containing barriers between the gate cavity and the environment; and
  wherein in the second position of the valve stem, the stem packing and the third seal provide two pressure containing barriers between the gate cavity and the environment.

15. The gate valve of claim 12, wherein the bonnet seal assembly further comprises first and second bi-directional seals which are mounted on the packing nut, the first bi-directional seal being sealingly engaged between the valve stem and the packing nut and the second bi-directional seal being sealingly engaged between the packing nut and the stem bore.

16. The gate valve of claim 12, further comprising:
  a pressure bleed port which extends laterally through the bonnet to a portion of the stem bore located between the first and second annular sealing surfaces; and
  a pressure relief valve which is mounted in the pressure bleed port.

17. The gate valve of claim 12, wherein the bonnet seal assembly further comprises a unidirectional seal which is positioned between the stem bore and a portion of the packing nut located between the first and second annular sealing surfaces, the unidirectional seal being configured to seal against pressure in a portion of the stem bore located axially outwardly of the unidirectional seal.

18. The gate valve of claim 12, wherein the stem bore comprises an enlarged diameter bore portion within which the packing nut is positioned, and wherein the fourth annular sealing surface is located at an axially inner end of the enlarged diameter bore portion.

19. The gate valve of claim 18, wherein the first annular sealing surface is formed proximate an axially outer end of the packing nut and the second annular sealing surface is formed proximate an axially inner end of the packing nut.

20. The gate valve of claim 12, wherein the packing nut is axially movably retained in the stem bore.

21. The gate valve of claim 20, wherein the packing nut is retained in the stem bore by a retainer nut which is secured to the bonnet axially outwardly of the packing nut.

22. The gate valve of claim 21, further comprising a spring member which is positioned between the retainer nut and the packing nut and is configured to bias the packing nut axially inwardly.

* * * * *